US012138757B2

(12) United States Patent
Klatt et al.

(10) Patent No.: US 12,138,757 B2
(45) Date of Patent: Nov. 12, 2024

(54) TORQUE TOOL

(71) Applicant: HAZET-WERK Hermann Zerver GmbH & Co. KG, Remscheid (DE)

(72) Inventors: Patrick Klatt, Hagen (DE); Christian Ballsieper, Remscheid (DE)

(73) Assignee: HAZET-WERK HERMANN ZERVER GMBH & CO. KG, Remscheid (DE)

( * ) Notice: Subject to any disclaimer, the term of this patent is extended or adjusted under 35 U.S.C. 154(b) by 0 days.

(21) Appl. No.: 18/573,688

(22) PCT Filed: May 24, 2022

(86) PCT No.: PCT/DE2022/100393
§ 371 (c)(1),
(2) Date: Dec. 22, 2023

(87) PCT Pub. No.: WO2022/268252
PCT Pub. Date: Dec. 29, 2022

(65) Prior Publication Data
US 2024/0261946 A1 Aug. 8, 2024

(30) Foreign Application Priority Data
Jun. 23, 2021 (DE) ..................... 20 2021 103 380.0

(51) Int. Cl.
*B25B 23/142* (2006.01)
*B25B 15/02* (2006.01)
*B25B 23/14* (2006.01)

(52) U.S. Cl.
CPC .......... *B25B 23/1427* (2013.01); *B25B 15/02* (2013.01); *B25B 23/141* (2013.01)

(58) Field of Classification Search
CPC ... B25B 23/142; B25B 23/1427; B25B 15/02; G01L 5/24
See application file for complete search history.

(56) References Cited

U.S. PATENT DOCUMENTS 8,495,935 B2 * 7/2013 Mountz ............... B25B 23/1427 81/473
8,763,500 B2 * 7/2014 Mountz ............... B25B 23/1427 81/473

(Continued)

FOREIGN PATENT DOCUMENTS

DE 202013103740 U1 9/2013
WO 2011005892 A1 1/2011

OTHER PUBLICATIONS

International Search Report of International Application No. PCT/DE2022/100393 mailed Aug. 26, 2022; 14pp.

(Continued)

*Primary Examiner* — David B. Thomas
(74) *Attorney, Agent, or Firm* — HAUPTMAN HAM, LLP

(57) ABSTRACT

A torque tool having a handle, a rotatable setting body for setting a torque, a display for a defined torque, which comprises a digit roller counter having at least two digit rollers. The digit roller counter is arranged in a hollow section of the handle with a viewing window through which the defined torque is visible, and has a passage through which a shaft section is guided. Between two digit rollers, a carrier disc arranged in a rotationally fixed manner in the handle is integrated. The carrier disc is rotatably assigned a control gear which has a driving toothing and a control toothing. One digit roller has an outer digit rim having a first rim section with a drive toothing and a second rim section with a control element. The setting body transmits a rotary movement of the setting body to the digit roller arranged on the setting body side.

9 Claims, 10 Drawing Sheets

(56) References Cited

U.S. PATENT DOCUMENTS

| | | | | |
|---|---|---|---|---|
| 9,132,537 | B2 * | 9/2015 | Lai Li | B25B 23/1427 |
| 9,421,675 | B2 | 8/2016 | Yu | |
| 9,999,966 | B2 * | 6/2018 | Ballsieper | B25B 23/1427 |
| 2011/0023576 | A1 | 2/2011 | Mountz et al. | |
| 2020/0156232 | A1 * | 5/2020 | Huang | B25F 5/001 |

OTHER PUBLICATIONS

Written Opinion of the International Searching Authority of International application No. PCT/DE2022/100393 mailed Aug. 26, 2022; 10pp.

Office Action in Corresponding Japanese Application No. 2023-563864, mailed May 22, 2024; 4 pgs.

Office Action in Corresponding Taiwan Patent Application No. 111119591, dated Feb. 20, 2023; 9 pgs.

* cited by examiner

TORQUE TOOL

RELATED APPLICATIONS

The present application is a National Phase of International Application Number PCT/DE2022/100393 filed May 24, 2022 and claims priority of German Application Number 20 2021 103 380.0 filed Jun. 23, 2021.

TECHNICAL FIELD

The present disclosure relates to a torque tool, for example, a torque screwdriver.

BACKGROUND

Torque tools, such as torque screwdrivers, are hand-held tools with which a controlled torque can be applied to a workpiece, generally a screw or nut. A defined tightening torque can be applied with adjustable torque tools in order to ensure the necessary clamping force or assembly pretension between the components to be connected.

In the case of torque screwdrivers, a release mechanism is usually housed in the handle. An adjustment device including a display for a torque to be adjusted is provided in the handle or on the handle. The desired torque is adjusted by compressing a compression spring by rotating the setting body on the handle, which is connected to a setting mechanism, usually a threaded spindle, relative to a fixed part of the handle.

An adjustable torque screwdriver is disclosed in U.S. Pat. No. 9,421,675 B2. The defined torque can be read on a display, which is designed as a scale or vernier.

DE 20 2013 103 740 U1 describes a torque spanner with a torque display as state of the art. The torque spanner has a display device for the defined torque. The display device comprises a digit roller counter with several digit rollers which are linked via a gear. The digit rollers are arranged in a housing that surrounds the handle on the outside. The axle rod of the gearbox passes through the gears on one side in the housing. To accommodate the digit roller counter, the housing must be made in two parts. The housing is formed by an upper cover and a lower cover that face each other and are attached to the handle of the torque spanner. In terms of installation space and function, this design could be improved.

SUMMARY

The invention is based on the prior art and has the task of improving a torque tool, in particular a torque screwdriver, in terms of installation space, application technology and function.

The solution to this problem lies in a torque tool, for example, a torque screwdriver.

Design and modifications of features of the torque tool, which individually or in combination make the invention technically advantageous, are also apparent from the description and the accompanying drawings.

A torque tool according to the invention is in particular a torque screwdriver. The torque tool has a handle and a setting body, which can be rotated about the longitudinal axis of the handle, for adjusting a torque. A defined torque or the defined value of the torque is shown on a display and can be read through a viewing window. The display comprises a digit roller counter which has at least two digit rollers.

According to the invention, the digit roller counter is arranged in a hollow, cylindrical, longitudinal section of the handle. The viewing window is provided in the longitudinal section, through which the defined value of the torque is visible. The viewing window is made by a recess or an opening in the wall of the handle in the hollow, cylindrical, longitudinal section. The digit roller counter has a passage in its centre axis through which a shaft section is guided. A non-rotating carrier disc is integrated between two digit rollers in the handle. A control gear is rotatably assigned to the carrier disc. The control gear has a driving toothing and a control toothing. A digit roller has an outer digit rim provided with digits, which has a first rim section with an inner drive toothing and a second rim section with a control element. The setting body has means for transmitting a rotary movement of the setting body, the digit roller arranged on the setting body side.

The torque tool according to the invention is improved in terms of installation space, application technology and function. In the torque tool according to the invention, a compact digit roller counter with an internal gear chain is integrated in the handle. The digit roller counter is arranged in a hollow, cylindrical, longitudinal section of the handle.

Preferably, the means for transmitting the rotary movement of the setting body and the drive toothing of the first digit roller adjacent to the setting body, i.e. the digit roller on the setting body side, are permanently engaged.

The setting body is permanently radially coupled to the first digit roller on the setting body side. This is done via drivers on the setting body and the drive toothing on the first digit roller. The first digit roller shows the lowest defined value. Due to the permanent coupling, every rotary movement of the setting body is transmitted to the first digit roller. On the opposite side, the first digit roller has a control element. This is preferably an internal tooth segment. Between two digit rollers, for example the first digit roller on the setting body side and the following second digit roller, there is a carrier disc. The carrier disc has an off-centre shaft journal on which the control gear is mounted or held. The carrier disc is connected to the handle so that it cannot rotate. For this purpose, the carrier disc has, in particular, a radial projection that engages in a groove- or slot-shaped recess on the inner circumference of the hollow, cylindrical, longitudinal section. The control gear has a driving toothing and a control toothing. The driving toothing interact with the drive toothing of a digit roller. The control toothing interact with the control element of a digit roller. The control element located on one side of the carrier disc ensures that, after each full rotation, the following digit roller is increased or decreased by a numerical value. At least two digit rollers are required for implementation. The system can be advanced in technically required and meaningful numbers by one digit roller, one carrier disc and one control gear. Since the digit rollers each have a control element, each full rotation of the previously arranged digit roller produces a change of one digit in the following digit roller. The number of control elements determines how often the following digit roller is advanced during one revolution. The number of control elements and the number of further control are therefore proportional to each other.

The invention provides a torque tool, in particular a torque screwdriver, with a display in which the entire display system with the digit roller counter can be inserted into the handle as a unit. This is done from the side of the setting body into the hollow, cylindrical, longitudinal section of the handle. The digit roller counter and its components are mutually supportive. The digit roller counter is counter-bearing mounted in the handle. This is achieved by the non-rotating arrangement of the carrier discs in the handle. A shaft section is guided centrally through the digit roller counter and the passage lying in the centre axis. This particularly advantageous aspect of the torque tool according to the invention enables the connection or coupling of the components of the torque tool arranged on the setting body side and the components of the torque tool arranged on the output side of the digit roller counter, in particular the torque setting mechanism and an adjustment arrangement.

An advantageous design means that the carrier disc has a radial projection which projects or engages in a recess in the handle. In this way, a counter bearing or the abutment of the digit roller counter is realised via the carrier disc.

A further particularly preferred design provides that the setting body has a port with drivers which are engaged with the drive toothing of the digit roller on the setting body side. Preferably, the drivers are arranged on the front side of the port.

The shaft section passing through the central passage in the digit roller counter is preferably part of an adjusting shaft which is part of an adjusting arrangement via which an adjustment can be carried out between the defined value of a torque indicated by the digit roller counter and the release torque.

A digit roller has a hub and a disc body arranged between the hub and the outer digit rim.

The control gear is mounted on a shaft journal arranged off-centred on the carrier disc.

A carrier disc has a pot-shaped configured centre piece. A radial disc section extends from the centre piece concentrically around the centre piece. The control gear is arranged in a holding system of the carrier disc, which is arranged in the area of the outer circumference of the centre piece. The disc section has an opening in the area of the holding system. The control wheel protrudes through the opening in part with the driving toothing, so that the section of the driving toothing facing the downstream digit roller engages with the drive toothing of the downstream digit roller.

The control toothing are connected to the driving toothing on the face side. The driving toothing have a number of teeth and the control toothing have a number of control teeth, the number of driving teeth being twice the number of control teeth. The ratio of the number of driving teeth to the number of control teeth is 2:1. The number of driving teeth is therefore twice as large as the number of control teeth.

The control teeth are arranged on a pitch circle at an angle to each other, with one control tooth congruent with one driving tooth in each case. The control gear with six driving teeth has three corresponding control teeth, which are arranged at an angle of 120° to each other.

A further practically advantageous design of the digit roller counter is that a digit roller has an annular collar on the control element side, which has a recess in the area of the control element. The ring collar covers the control teeth of the control toothing except for one control tooth. One of the protruding control teeth interacts with the control element of a digit roller. After each complete revolution of a digit roll, the protruding control tooth is detected by the control element. The control tooth is turned further by 120° so that the next control tooth protrudes opposite the ring collar. Turning the control tooth further by 120° advances the downstream digit roller by one digit.

While the first digit roller, driven by the setting body, performs a rotary movement, the control gear is held until, after a complete revolution, the setting element of the first digit roller engages with a control tooth of the control gear and this continues to rotate by an arc section corresponding to a changeover of the digit roller by one digit. The following digit roller is therefore advanced or rotated by one digit. While the first digit roller makes another revolution, the permanent engagement between the driving toothing of the control gear and the second digit roller prevents the second digit roller and the subsequent digit rollers from turning. Only when the second digit roller has made a complete revolution is the third digit roller following the second digit roller moved by one digit position.

BRIEF DESCRIPTION OF DRAWINGS

The invention is explained in more detail in the following using the drawings. They indicate as follows.

DETAILED DESCRIPTION

Figure 1:
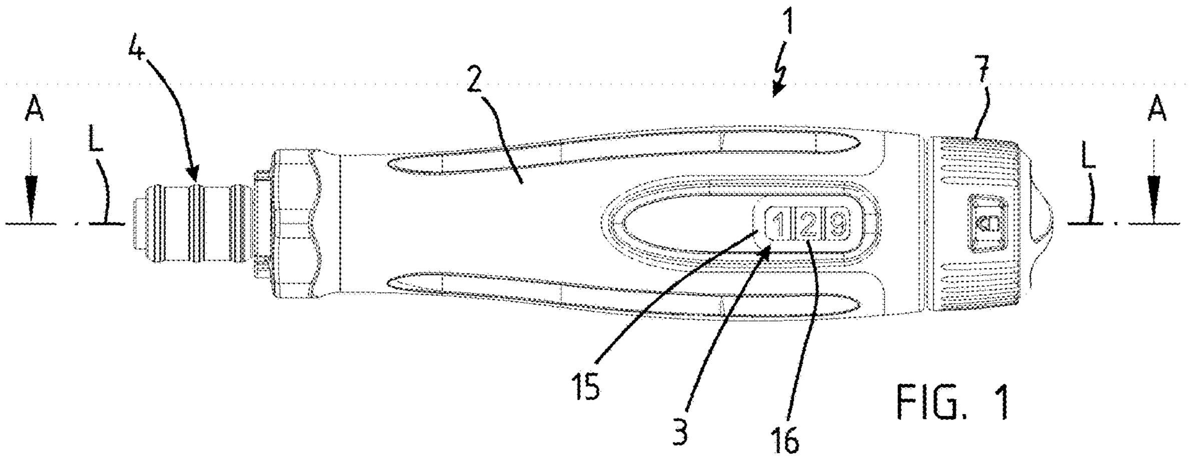
FIG. 1 shows a torque tool according to the invention in the form of a torque screwdriver in a side view.
Figure 2:
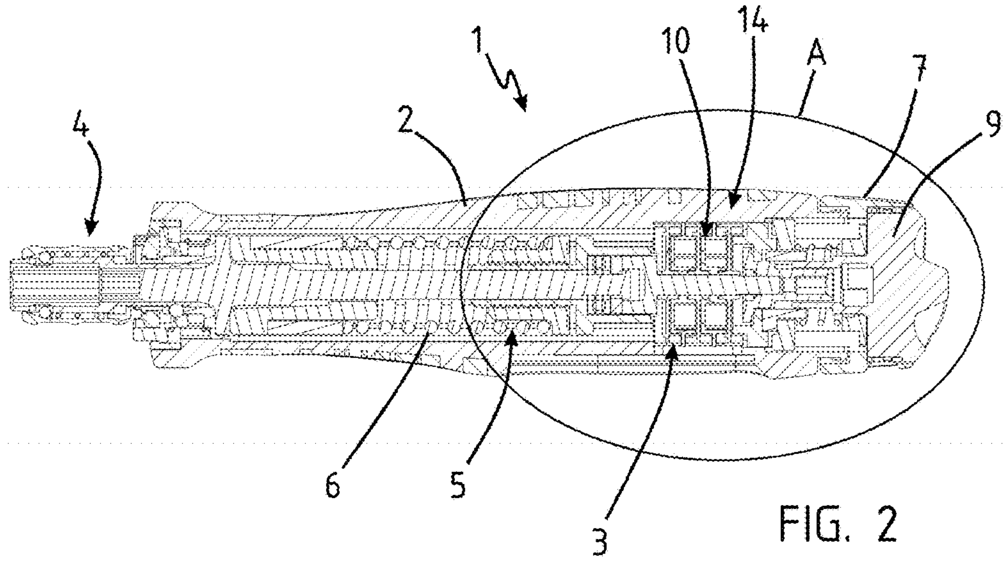
FIG. 2 shows a longitudinal cross-section through the illustration of FIG. 1 along line A-A.
Figure 3:
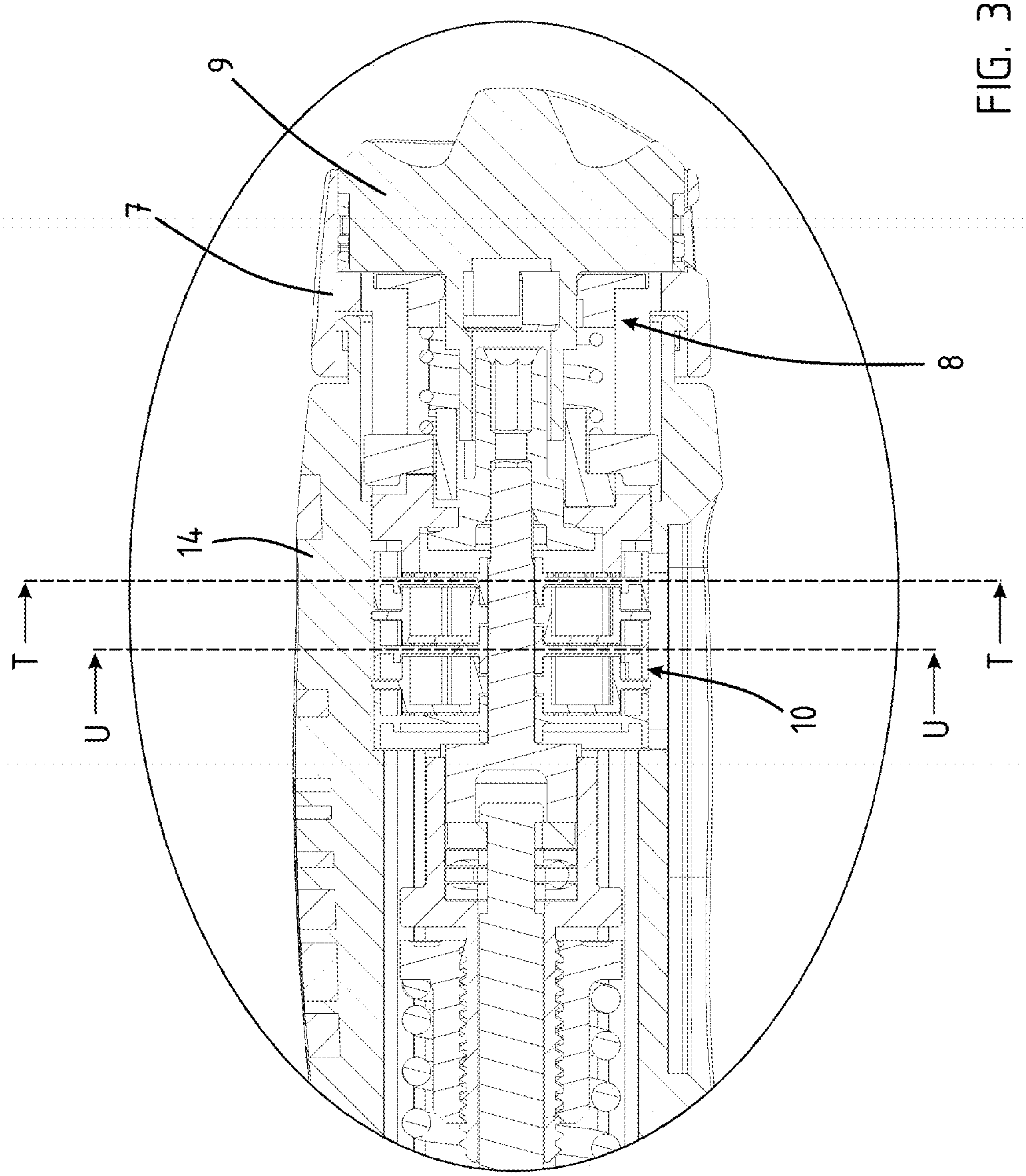
FIG. 3 shows an enlarged view of section A as shown in FIG. 2.
Figure 4:
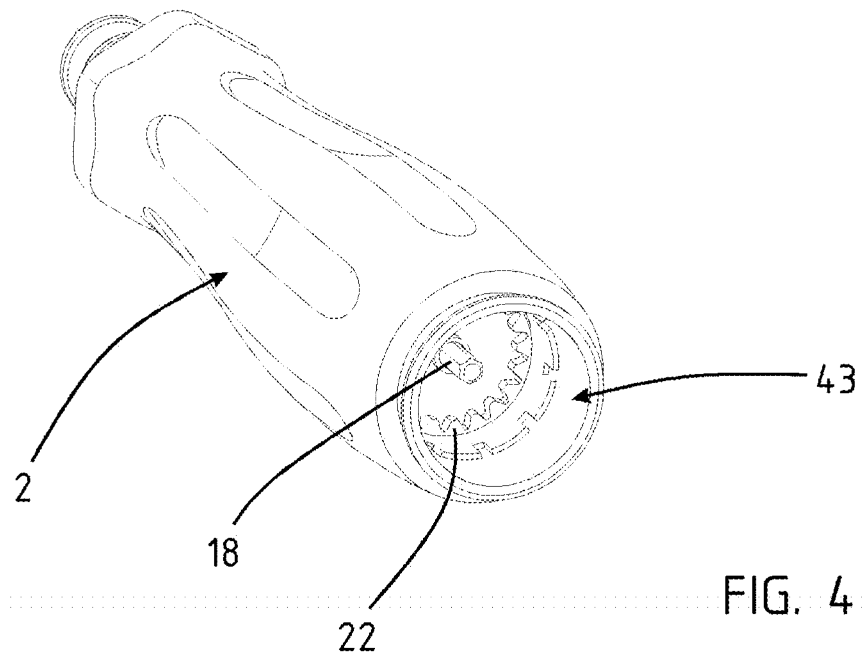
FIG. 4 shows a perspective view of the handle of the torque screwdriver.
Figure 5:
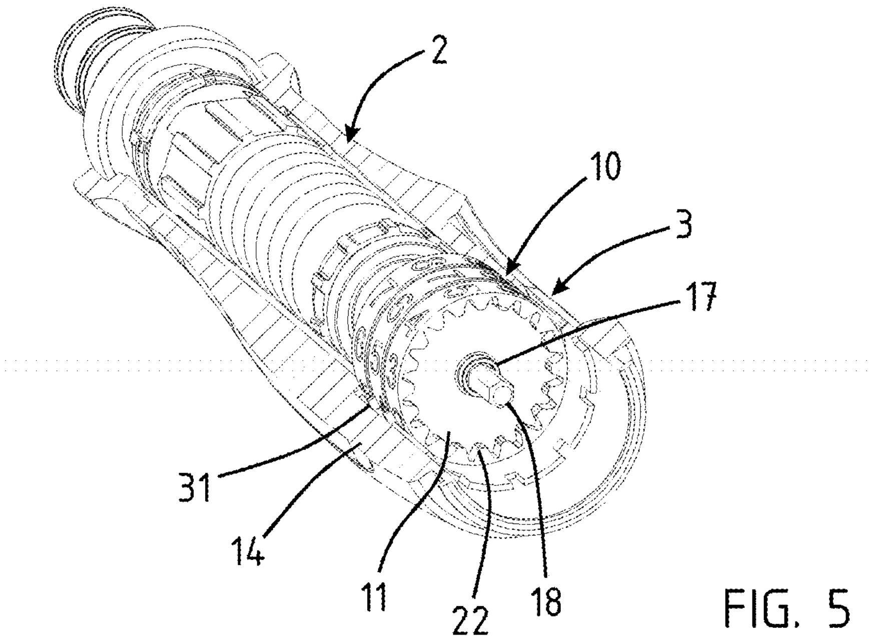
FIG. 5 shows a first sectional view through the handle as shown in FIG. 4.
Figure 6:
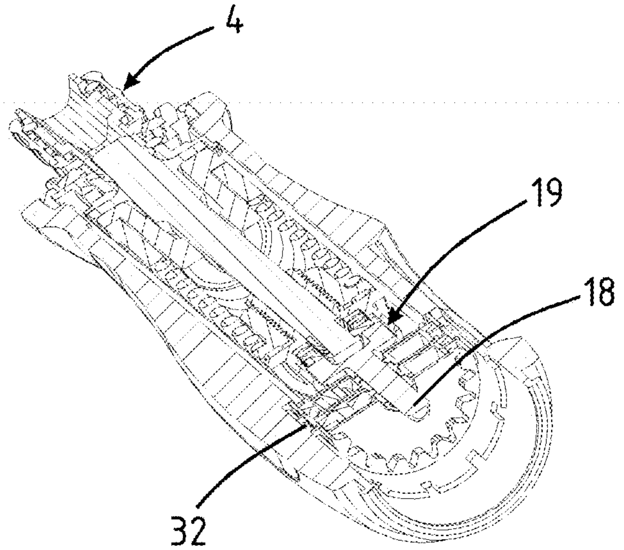
FIG. 6 shows a second sectional view through the handle as shown in FIG. 4.
Figure 7:
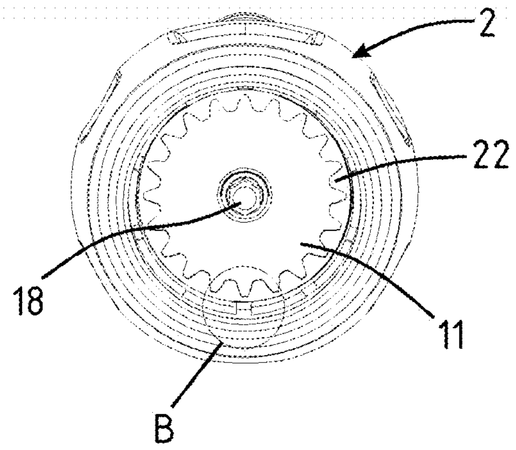
FIG. 7 shows a frontal view of the handle from the setting body side.
Figure 8:
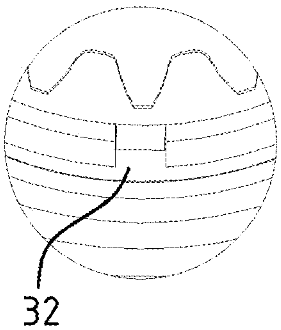
FIG. 8 shows an enlarged view of detail B from FIG. 7.
Figure 9:
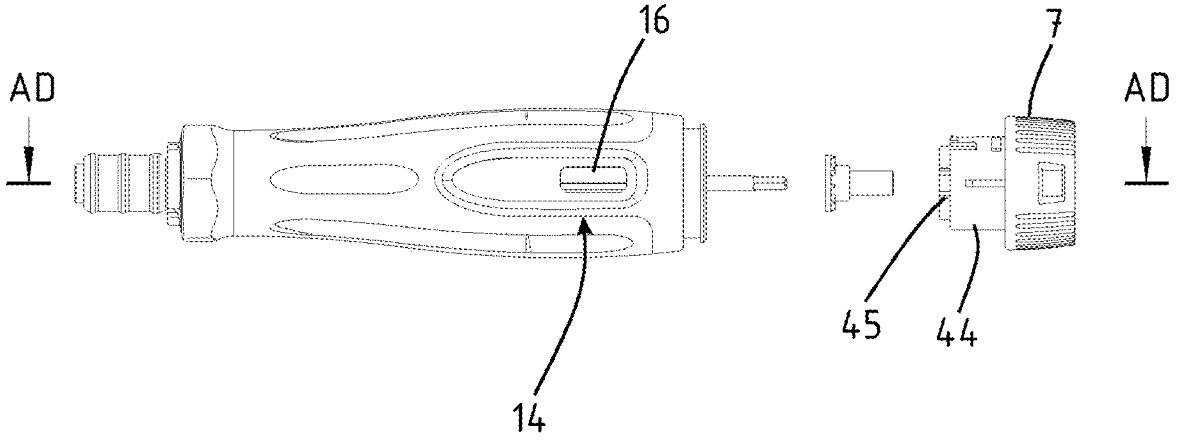
FIG. 9 shows an exploded view of the components of the torque screwdriver.
Figure 10:
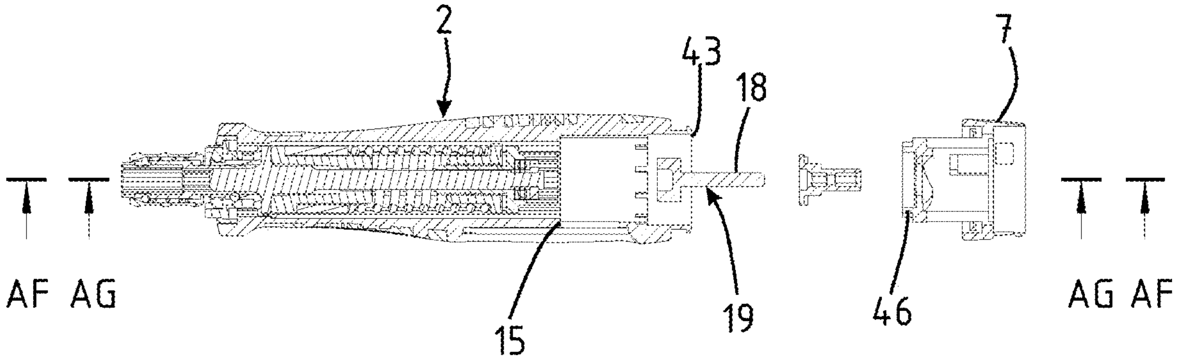
FIG. 10 shows a cross-section through the illustration of FIG. 9 along line AD-AD.
Figure 11:
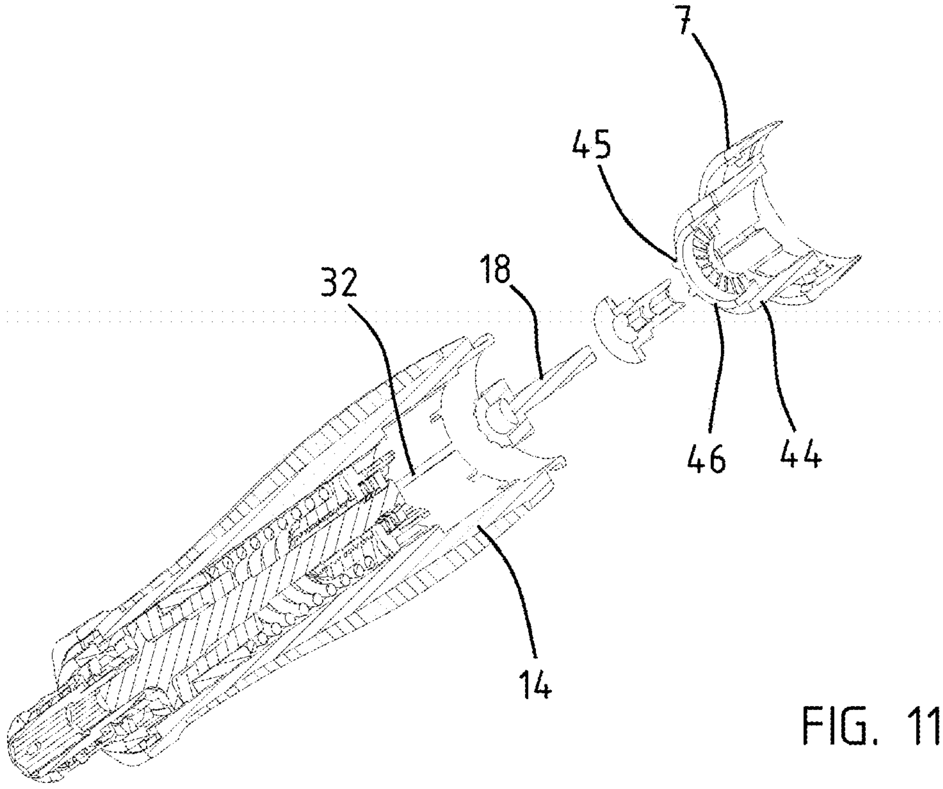
FIG. 11 shows a cross-section through the illustration of FIG. 10 along line AG-AG in a perspective view.
Figure 12:
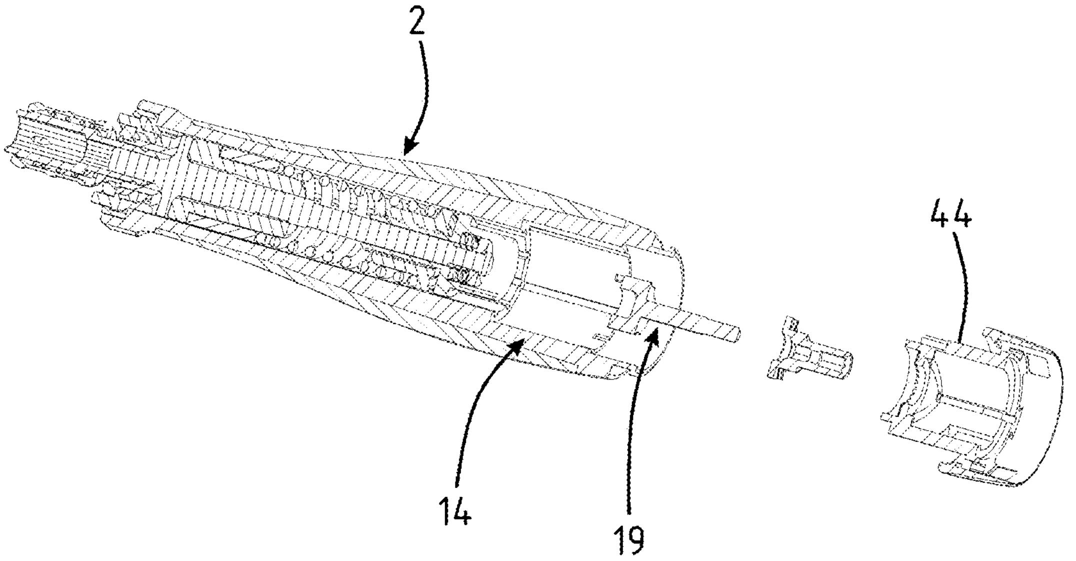
FIG. 12 shows a cross-section through the illustration of FIG. 10 along line AF-AF in a perspective view.
Figure 13:
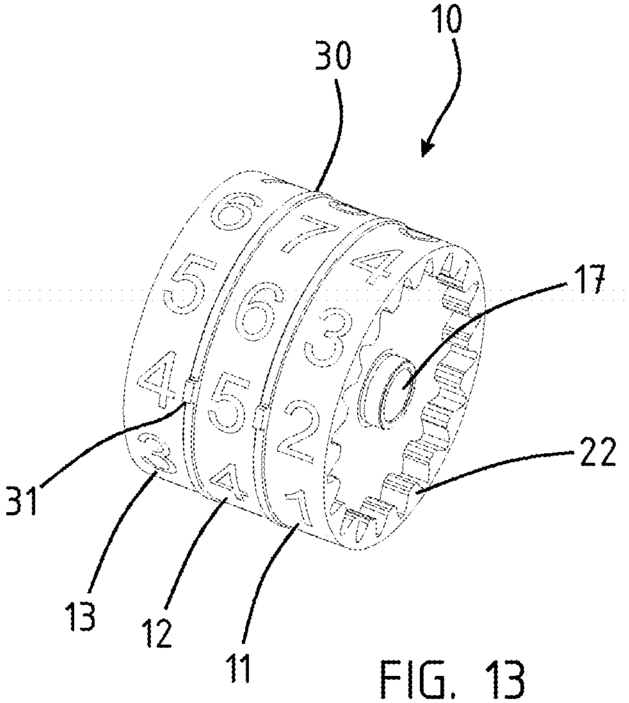
FIG. 13 shows a perspective view the digit rollers of a digit roll counter.
Figure 14:
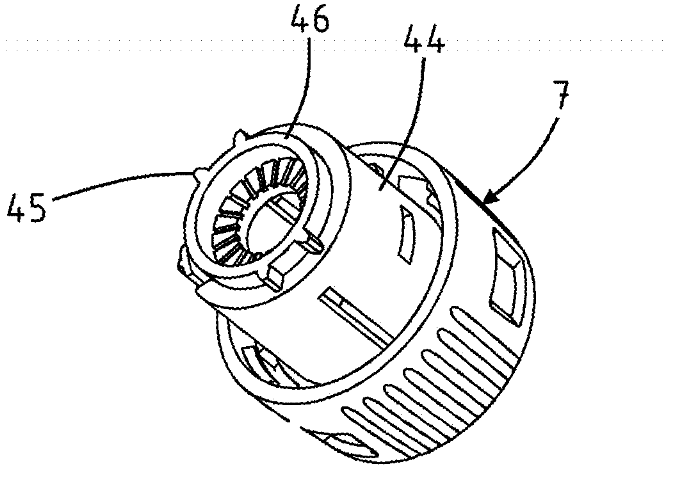
FIG. 14 shows a perspective view of a setting body of a torque screwdriver.
Figure 15:
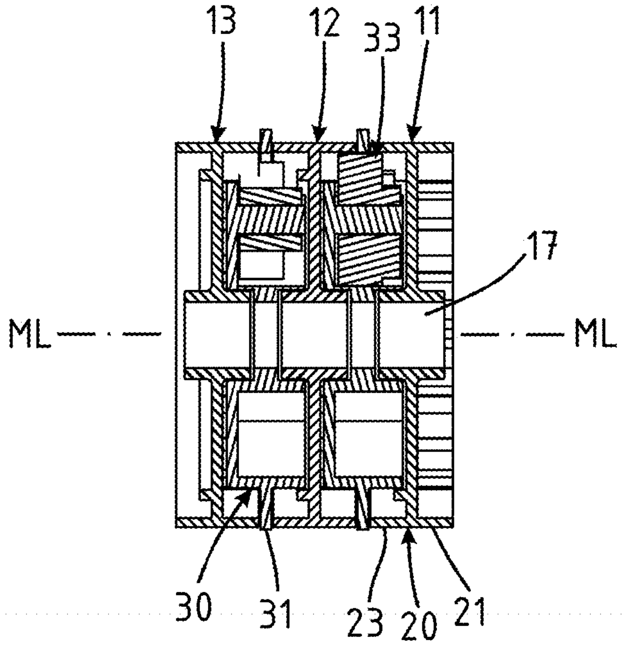
FIG. 15 shows a vertical cross-section through a digit roller counter.
Figure 16:
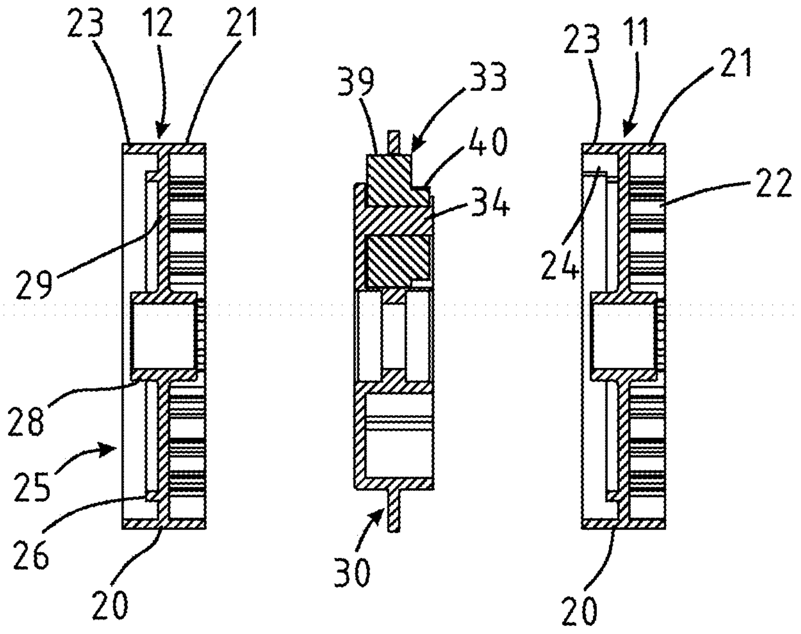
FIG. 16 shows the components of the digit roller counter in accordance with the illustration in FIG. 15 in an expanded view.
Figure 17:
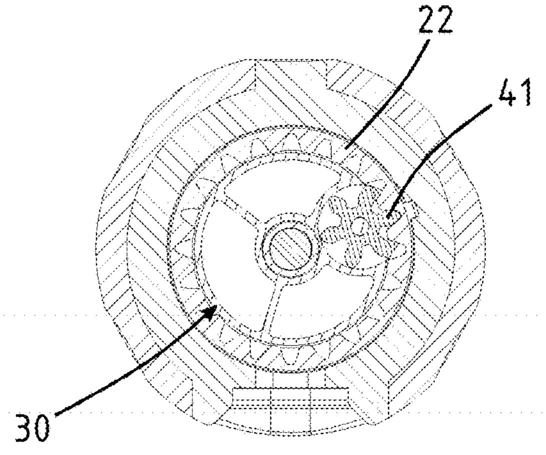
FIG. 17 shows a cross-section through the illustration of FIG. 3 along line U-U.

With reference to FIGS. 1 to 21, a torque tool according to the invention in the form of a torque screwdriver 1 and components thereof are described.

The torque screwdriver 1 has a handle 2 and a display 3 for an adjusted torque and an output 4. Integrated in the handle 2 is an adjustment device 5 for adjusting a specific torque or a defined tightening torque. The adjustment device 5 includes a setting mechanism, not described in detail here, with which the desired torque is adjusted by compressing a compression spring 6.

The adjustment device 5 and its setting mechanism interact with a setting body 7 on the handle 2. The setting body 7 can be rotated about the longitudinal axis L relative to the handle 2. The torque is adjusted by rotating the setting body 7 relative to the fixed portion of the handle 2. In order to secure the respectively adjusted torque against an unintentional adjustment, the setting body 7 is fixed by means of a lock 8 which is actuated by a locking body 9.

The output 4 of the torque screwdriver 1 is arranged on the front side in the handle 2. The output 4 is designed to accommodate exchangeable insertion tools. The output 4 is equipped with a holding system intended for this purpose so that different insertion tools can be exchanged.

The display 3 for an adjusted torque has a digit roller counter 10 with a plurality of digit rollers 11, 12, 13 arranged one behind the other. In the example shown here, a total of three digit rollers 11, 12, 13 are provided. The digit roller counter 10 is arranged in a hollow, cylindrical, longitudinal section 14 of the handle 2. The wall 15 of the longitudinal section 14 is pierced by a viewing window 16. A section of the digit roller counter 10 and the defined torque are visible through the viewing window 16.

The digit roller counter 10 has a passage 17 in its central axis ML. A shaft section 18 is guided through the passage 17. The shaft section 18 is a part of an adjusting shaft 19 which is a component of an adjusting arrangement via which an adjustment can be carried out between the defined value of a torque indicated by the digit roller counter 10 and the release torque.

The digit roller counter 10 and the components of the display 3 that are part of the digital roller counter 10, individually and in various combinations, can be seen in particular in FIGS. 13 and 15 to 21.

A digit roller 11, 12, 13 has an outer cylindrical digit rim 20 provided with digits. The digit rim 20 has a first rim section 21 with a drive toothing 22 and a second rim section 23 with a control element 24. The drive toothing 22 are arranged circumferentially on the inner circumference of the first rim section 21. The control element 24 is formed by a single internally toothed tooth segment. On the side 25 of a digit roller 11, 12, 13 on which the control element 24 lies, i.e. on the control element side, each digit roller 11, 12, 13 has an annular collar 26 which has a recess 27 in the area of the control element 24.

Each digit roller 11, 12, 13 has a hub 28 and a disc body 29 arranged between the hub 28 and the outer digit rim 20. Between two digit rollers 11, 12 or 12, 13, there is a carrier disc 30 which is held in the handle 2 so that it cannot rotate. The carrier disc 30 has a radial projection 31 which engages in a recess 32 in the handle 2. A carrier disc 30 is countersupported in the handle 2 by the projection 31 projecting into the recess 32 and is held in a rotationally fixed manner.

A control gear 33 is rotatably assigned to each carrier disc 30. The control gear 33 is mounted on a shaft journal 34 arranged off-centre on the carrier disc 30. The carrier disc 30 has a pot-shaped configured centre piece 35 with a radial disc section 36. The control gear 33 is arranged in a holding system 37, which is arranged in the area of the outer circumference of the centre piece 35. In the area of the holding system 37, the disc section 36 has an opening 38.

The control gear 33 has a driving toothing 39 and a control toothing 40. The control teeth 40 adjoin the driving teeth 39 on the face side. The driving toothing 39 has a number of driving teeth 41. The control toothing 40 has a number of control teeth 42. The number of driving teeth 41 is twice the number of control teeth 42. In the example shown, there are a total of three control teeth 42, which are arranged on a pitch circle at an angle of 120° to each other. In each case, a control tooth 42 is oriented congruently with a driving tooth 41.

The control gear 33 sits in the holding system 37 on the shaft journal 34. The driving toothing 39 lie in the opening 38 in some areas, so that the driving toothing 39 protrude on both sides in relation to the disc section 36.

The digit roller counter 10 is inserted as a unit from the opening on the setting body side 43 into the handle 2 and positioned in the hollow, cylindrical, longitudinal section 14. The shaft section 18 is guided through the passage 17. The protrusions 31 of the carrier discs 30 engage in the recesses 32 on the inner circumference of the longitudinal section 14 in an abutting manner.

The setting body 7 has a port 44. Drivers 45 are arranged on the front side of the port 44. The drivers 45 are tooth-like in design and are arranged projecting outwards on an annular web 46 of the port 44. Two drivers 45 each are provided on the circumference at a small distance from each other and form a driver pair. On the circumference of the annular web 46, two pairs of drivers, each formed by two drivers 45, lie diametrically opposite each other.

The drivers 45 of the setting body 7 are engaged with the drive toothing 22 of the first digit roller on the setting body side 11. In this way, a rotary movement of the setting body 7, via which an adjustment of the torque or release element is made, is transmitted directly to the first digit roller 11.

Between the first digit roller 11 and the second digit roller 12 as well as between the second digit roller 12 and the third digit roller 13, a carrier disc 30 is arranged in a rotationally fixed manner in each case. The first carrier disc 30 between the first digit roller 11 and the second digit roller 12 has the task of transmitting a rotary movement between the first digit roller 11 and the second digit roller 12. After a complete rotation of the first digit roller 11, the second digit roller 12 is rotated by one digit or one position. After the second digit roller 12 has made a complete revolution, the following third digit roller 13 is moved forward by one digit or one position.

Figure 18:
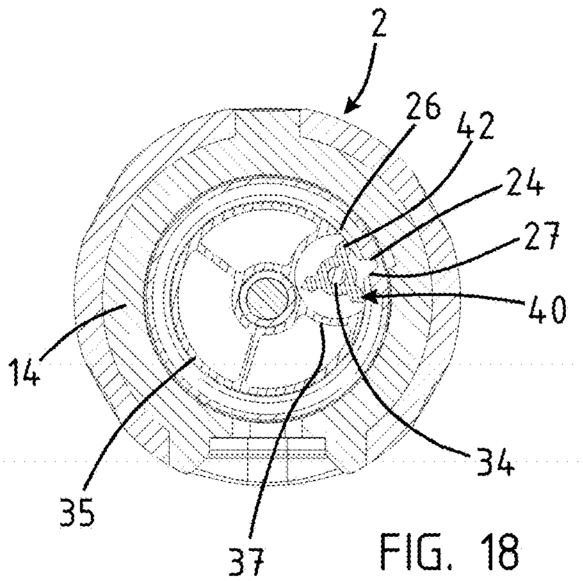
FIG. 18 shows a cross-section through the illustration of FIG. 3 along line T-T.
Figure 19:
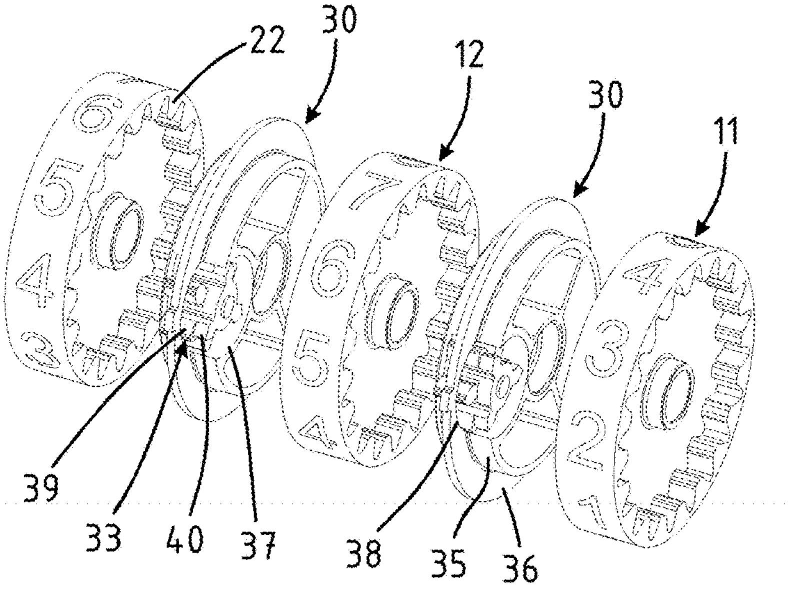
FIG. 19 shows an perspective exploded view of the components of a roller counter.
Figure 20:
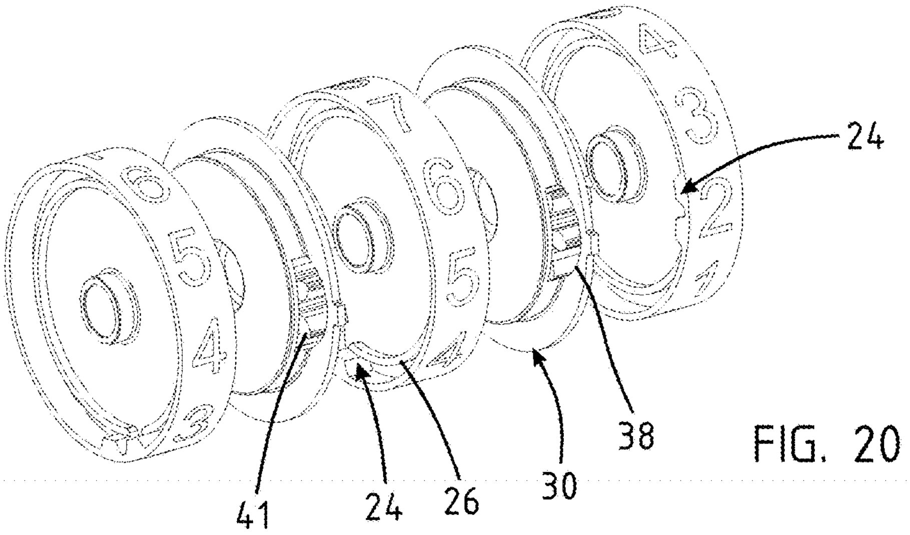
FIG. 20 shows the components of the digit roller counter from a different perspective.
Figure 21:
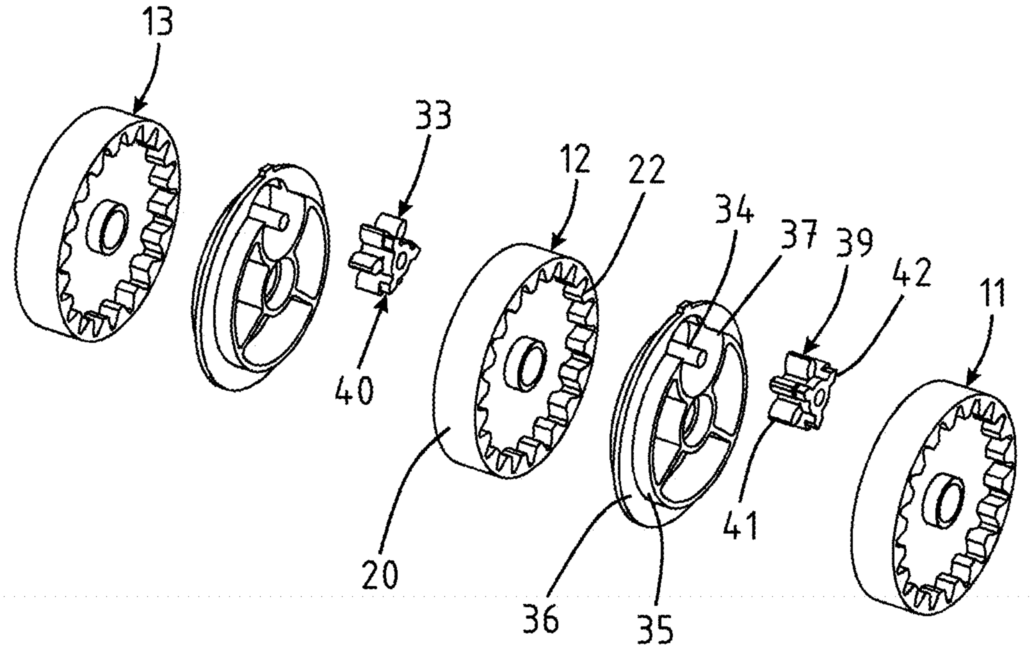
FIG. 21 shows another perspective exploded view of the components of a digit roller counter.

As can be seen in FIG. 18, the annular collar 26 overlaps the control teeth 40. Two adjacent control teeth 42, which are arranged at an angle of 120° to each other, lie against the inside of the collar 26. The collar 26 slides over the two control teeth 42. The control gear 33 is stationary in this position until a digit roller 11, 12, 13 with the control element 24 and the recess 27 moves over a control tooth 40. The control gear 33 is released in this position and is turned one position or one digit further.

Since the control gear 33 engages with the driving toothing 39 in the drive toothing 22 of the following second digit roller 12, the digit roller 12 is held in place by the control gear 33 while the first digit roller 11 is rotated. After a complete revolution of the first digit roller 11, the control gear 33 comes into engagement with the control toothing 40 or a control tooth 42 and the control element 24. The control gear 33 is turned one position further and the digit roller 12 is adjusted by one digit. Afterwards, the control teeth 42 are covered again by the collar 26. The control gear 33 and the digit roller 12 are held in a fixed position until the control element 24 engages with a control tooth 42 again after a further complete rotation and the control gear 33 and the digit roller 12 are rotated by a further position. In the same way, the third digit roller 13 is then also rotated by one further digit or position.

REFERENCE NUMERALS

1—torque screwdriver
2—handle
3—display
4—output
5—adjustment device
6—compression spring
7—setting body
8—lock
9—locking body
10—digit roller counter
11—digit roller
12—digit roller
13—digit roller
14—longitudinal section
15—wall
16—viewing window
17—passage
18—shaft section
19—adjusting shaft
20—digit rim
21—first rim section
22—drive toothing
23—second rim section
24—control element
25—side of 11, 12, 13
26—collar
27—recess
28—hub
29—disc body
30—carrier disc
31—projection
32—recess
33—control gear
34—shaft journal
35—centre piece
36—disc section
37—take-up
38—opening
39—driving toothing
40—control toothing
41—driving tooth
42—control tooth
43—opening
44—port
45—driver
46—annular web
L—longitudinal axis
ML—centre axis

The invention claimed is:

1. A torque tool, comprising:

a handle and a setting body rotatable about a longitudinal axis of the handle for setting a torque; and a display for a defined torque, the display comprising a digit roller counter, the digit roller counter comprising at least two digit rollers, wherein the digit roller counter is arranged in a hollow, cylindrical, longitudinal section of the handle, the handle comprises a viewing window through which the defined torque is visible, the digit roller counter has, in a centre axis thereof, a passage through which a shaft section is guided, between two digit rollers of the at least two digit rollers, a carrier disc is arranged and is rotationally fixed to the handle, the carrier disc is assigned to a control gear which has a driving toothing and a control toothing, each digit roller of the at least two digit rollers comprises an outer digit rim, which has a first rim section with a drive toothing and a second rim section with a control element, and the setting body is configured to transmit a rotary movement of the setting body to, among the at least two digit rollers, the digit roller on a side of the setting body.

2. The torque tool according to claim 1, wherein the carrier disc comprises a radial projection which projects into a recess in the handle.

3. The torque tool according to claim 1, wherein the setting body comprises a port with a driver configured to engage with the drive toothing of the digit roller on the side of the setting body.

4. The torque tool according to claim 1, wherein the shaft section is part of an adjusting shaft, and the adjusting shaft is part of an adjusting arrangement configured to carry out an adjustment between the defined torque indicated by the digit roller counter and a release torque.

5. A torque tool according to claim 1, wherein each digit roller of the at least two digit rollers comprises a hub, and a disc body arranged between the hub and the outer digit rim.

6. The torque tool according to claim 1, wherein the control gear is mounted on a shaft journal arranged eccentrically on the carrier disc.

7. The torque tool according to claim 1, wherein the carrier disc comprises a pot-shaped central piece with a radial disc section, the control gear is in a holding system which is arranged in a region of an outer circumference of the central piece, and the radial disc section comprises an opening in a region of the holding system.

8. The torque tool according to claim 1, wherein the control toothing adjoins the driving toothing on a face thereof, the driving toothing comprises a number of driving teeth and the control toothing comprises a number of control teeth, the number of driving teeth being twice the number of control teeth, and the control teeth are arranged on a pitch circle at an angle to one another and in each case one control tooth being oriented congruently with a driving tooth.

9. The torque tool according to claim 1, wherein each digit roller of the at least two digit rollers comprises an annular collar on a side of the control element, and the annular collar comprises a recess in a region of the control element.

* * * * *